(12) United States Patent
Cyrusian

(10) Patent No.: US 9,049,068 B1
(45) Date of Patent: Jun. 2, 2015

(54) MULTIPATH CONTINUOUS TIME LINEAR EQUALIZER WITH ALLPASS FILTER

(71) Applicant: Marvell International Ltd., Hamilton (BM)

(72) Inventor: Sasan Cyrusian, Scotts Valley, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 13/966,809

(22) Filed: Aug. 14, 2013

Related U.S. Application Data

(60) Provisional application No. 61/683,372, filed on Aug. 15, 2012.

(51) Int. Cl.
*H03H 7/30* (2006.01)
*H04L 25/03* (2006.01)

(52) U.S. Cl.
CPC ............................. *H04L 25/03006* (2013.01)

(58) Field of Classification Search
None
See application file for complete search history.

(56) References Cited

U.S. PATENT DOCUMENTS

| 6,014,042 A | 1/2000 | Nguyen | |
|---|---|---|---|
| 2007/0047636 A1* | 3/2007 | Lim et al. | 375/229 |
| 2010/0046597 A1 | 2/2010 | Farjad-Rad | |
| 2011/0032977 A1* | 2/2011 | Hsiao et al. | 375/232 |

OTHER PUBLICATIONS

Thomas Toifl et al., "A 2.6 mW/Gbps 12.5 Gbps RX With 8-Tap Switched-Capacitor DFE in 32 nm CMOS", IEEE Journal of Solid-State Circuits, Apr. 1, 2012, pp. 897-910, vol. 4 7, No. 4, Piscataway, NJ, USA.
Reid Riedlinger et al., "A 32 nm, 3.1 Billion Transistor, 12 Wide Issue ItaniumA TM Processor for Mission-Critical Servers", IEEE Journal of Solid-State Circuits, Jan. 1, 2012, pp. 177-193, vol. 47, No. 1, Piscataway, NJ, USA.
Balamurugan Get al., "Modeling and Analysis of High-Speed I/O Links", IEEE Transactions on Advanced Packaging, May 1, 2009, pp. 237-247, vol. 32, No. 1, Piscataway, NJ, USA.
International Search Report and Written Opinion for PCT/182013/001752, filed on Aug. 10, 2013.

* cited by examiner

*Primary Examiner* — Adolf Dsouza

(57) ABSTRACT

An equalizer includes a first module and a second module. The first module is configured to receive a differential input signal, perform low pass filtering on the differential input signal to generate a low pass differential input signal, and perform high pass filtering on the differential input signal to generate a high pass differential input signal. The second module is configured to receive the low pass differential input signal and the high pass differential input signal and generate a differential output signal based on a combination of the low pass differential input signal and the high pass differential input signal.

25 Claims, 5 Drawing Sheets

MULTIPATH CONTINUOUS TIME LINEAR EQUALIZER WITH ALLPASS FILTER

CROSS-REFERENCE TO RELATED APPLICATIONS

This application claims the benefit of U.S. Provisional Application No. 61/683,372, filed on Aug. 15, 2012. This application is related to U.S. patent application Ser. No. 13/962,900, filed on Aug. 8, 2013. The entire disclosures of the applications referenced above are incorporated herein by reference.

FIELD

The present disclosure relates to a continuous time linear equalizer for a receiver path of a communication interface.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A signal path between a transmitter and a receiver (e.g., a receiver path of a serial data interface) includes a communication channel. A signal transmitted via the communication channel may be modified by noise, interference, and/or frequency-dependent attenuation. Frequency-dependent attenuation can introduce distortions into the transmitted signal. For example, the distortions may include inter-symbol interference (ISI) and jitter. The distortions may cause errors in the signal as received by the receiver.

The communication channel may be implemented using differential signaling. Differential signaling can reduce the effects of some forms of interference, such as common mode noise. Equalizers such as Continuous Time Linear Equalizers (CTLEs) may be used in communication channels to partially compensate for channel attenuation. A CTLE may be implemented as a differential amplifier with a fixed or programmable frequency dependent degeneration feature. For example, programmable frequency dependent degeneration may be implemented, which allows adjusting one or more resistance and/or capacitance values in the differential amplifier. The resistance and capacitance values may also define a "roll up point," which refers to a minimum frequency at which the differential amplifier will start to boost the output signal of the differential amplifier.

FIG. 1 shows a receiver path 100 (e.g., of a serial data receiver) including a communication channel 104, an equalizer 108, a sampler 112, a summer 116, a decision feedback estimation (DFE) module 120, and a slicer 124. The equalizer 108 may be, for example, a switched continuous time linear equalizer (CTLE) or a switched CTLE with an integrated sampler.

The equalizer 108 receives an input signal 128 via the communication channel 104 and generates an output signal 132. Each of the input signal 128 and the output signal 132 may include a differential signal pair. The equalizer 108 performs equalization on the input signal 128 to generate the output signal 132. For example, the equalizer 108 may include a differential amplifier.

The input signal 128 received from the communication channel 104 may include attenuation (e.g., frequency dependent attenuation). For example, the frequency dependent attenuation caused by skin effect and dielectric loss, which are two possible sources of attenuation in the communication channel 104, is proportional to a square root of a frequency and the frequency, respectively. The equalizer 108 compensates for any attenuation in the input signal 128 to generate the output signal 132.

The sampler 112 samples the output signal 132 to generate a sampled signal 136. The summer 116 receives the sampled signal 136 and an output 140 of the DFE module 120. For example, the summer 116 may add one or more signals to the sampled signal 136 or subtract one or more signals from the sampled signal 136. The slicer 124 receives an output 144 of the summer 116 and determines a digital value corresponding to the input signal 128. The slicer 124 generates a digital output 148 that is, for example, a digital high (e.g., "1") or a digital low (e.g., "0"). In some implementations, the slicer 124 may determine a multi-bit digital value that corresponds to the input signal 128 and generate a corresponding multi-bit digital output 148. In some implementations, the summer 116 and the DFE module 120 may be omitted and the equalizer 108 is instead connected directly to the slicer 124.

FIG. 2 shows an example equalizer (e.g., a CTLE) 200. The equalizer 200 includes a first active device 204 and a second active device 208. The first active device 204 and the second active device 208 may include, for example, transistors (e.g., NMOS transistors). The first active device 204 and the second active device 208 receive a differential input signal 212 including a pair of differential inputs 216 and 220, respectively. The equalizer 200 generates a differential output signal 224 including a pair of differential outputs 228 and 232.

The equalizer 200 includes a resistor 236 and a capacitor 240 connected in parallel between the first active device 204 and the second active device 208. The resistor 236 may be a variable resistor including an electronically-controlled circuit having a variable resistance. The capacitor 240 may be a variable capacitor including an electronically-controlled circuit having a variable capacitance. Frequency dependent degeneration of the equalizer 200 may be programmed by adjusting the values of the resistor 236 and the capacitor 240. For example, the resistance and capacitance values of the resistor 236 and the capacitor 240, respectively, define a "roll up point," which refers to a frequency at which the equalizer 200 begins to boost the differential output signal 224 of the equalizer 200.

A power supply voltage 244 is provided to the equalizer 200 and is connected to the first active device 204 and the second active device 208 via a first load resistor 248, a second load resistor 252, a first load capacitor 256, and a second load capacitor 260. The capacitance values of each of the load capacitors 256 and 260 may represent parasitic capacitances in circuitry of a corresponding portion of the equalizer 200 and/or a capacitance of circuitry that is external to the equalizer 200. Similarly, values of each of the load resistors 248 and 252 may represent a resistance corresponding to leakage currents in circuitry of a corresponding portion of the equalizer 200 and/or a resistance of circuitry that is external to the equalizer 200. The resistance values of the load resistors 248 and 252 may be programmable values.

A first tail current Itail1 controlled by a first current source 264 and a second tail current Itail1 controlled by a second current source 268 are connected to ground 272. The first current source 268 and the second current source 272 may be configured such that the first tail current Itail1 has approximately the same magnitude and direction as that of the second tail current Itail1. Accordingly, each of the currents Itail1 and Itail2 correspond to one half of an overall current Itail (i.e., 0.5*Itail) flowing from the power supply voltage 244 to ground 272.

SUMMARY

An equalizer includes a first module and a second module. The first module is configured to receive a differential input signal, perform low pass filtering on the differential input signal to generate a low pass differential input signal, and perform high pass filtering on the differential input signal to generate a high pass differential input signal. The second module is configured to receive the low pass differential input signal and the high pass differential input signal and generate a differential output signal based on a combination of the low pass differential input signal and the high pass differential input signal.

A multipath equalizer includes a first active element configured to receive a first differential input of a low pass differential input signal, a second active element configured to receive a second differential input of the low pass differential input signal, a third active element configured to receive a first differential input of a high pass differential input signal, and a fourth active element configured to receive a second differential input of the high pass differential input signal. The multipath equalizer is configured to generate a differential output signal comprising a first differential output corresponding to a combination of the first differential input of the low pass differential input signal and the first differential input of the high pass differential input signal, and a second differential output corresponding to a combination of the second differential input of the low pass differential input signal and the second differential input of the high pass differential input signal.

A multipath equalizer includes a first active element configured to receive a first differential input of a differential input signal, a second active element configured to receive a second differential input of the differential input signal, a third active element configured to receive the first differential input of the differential input signal, and a fourth active element configured to receive the second differential input of the differential input signal. The multipath equalizer is configured to generate a differential output signal comprising a first differential output corresponding to a combination of outputs of the first active element and the third active element, and a second differential output corresponding to a combination of outputs of the second active element in the fourth active element.

A method of operating an equalizer includes receiving a differential input signal, performing low pass filtering on the differential input signal to generate a low pass differential input signal, performing high pass filtering on the differential input signal to generate a high pass differential input signal, and, using a multipath equalizer module, receiving the low pass differential input signal and the high pass differential input signal and generating a differential output signal based on a combination of the low pass differential input signal and the high pass differential input signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

An equalizer in a receiver path of a communication interface attenuates low frequency components of a differential output signal while boosting high frequency components of the differential output signal. Accordingly, the equalizer at least partially cancels attenuation of the high frequency components (i.e., provides amplitude equalization) caused by the communication channel. The communication channel may also distort phases of different frequency components of a received signal. For example, the distortion may be caused by different signal travel speeds for different frequencies (e.g., in a non-minimal phase, or "allpass," system). Further, a transfer function associated with the equalizer may be frequency dependent, which may cause amplitude attenuation at different respective frequencies.

An equalizer according to the principles of the present disclosure is configured to equalize distortions associated with both allpass systems and minimal phase systems. For example, the equalizer implements a programmable allpass filter including a programmable low pass filter component and a programmable high pass filter component to provide both a low pass differential input signal and a high pass differential input signal, respectively, to the equalizer.

Figure 1:
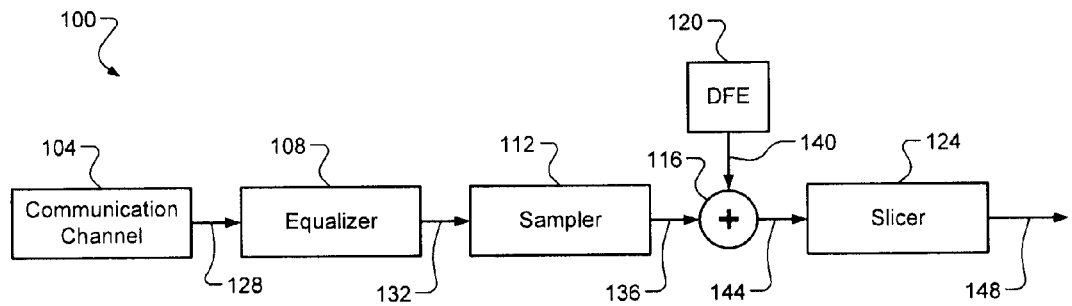
FIG. 1 is an example receiver path according to the prior art.
Figure 2:
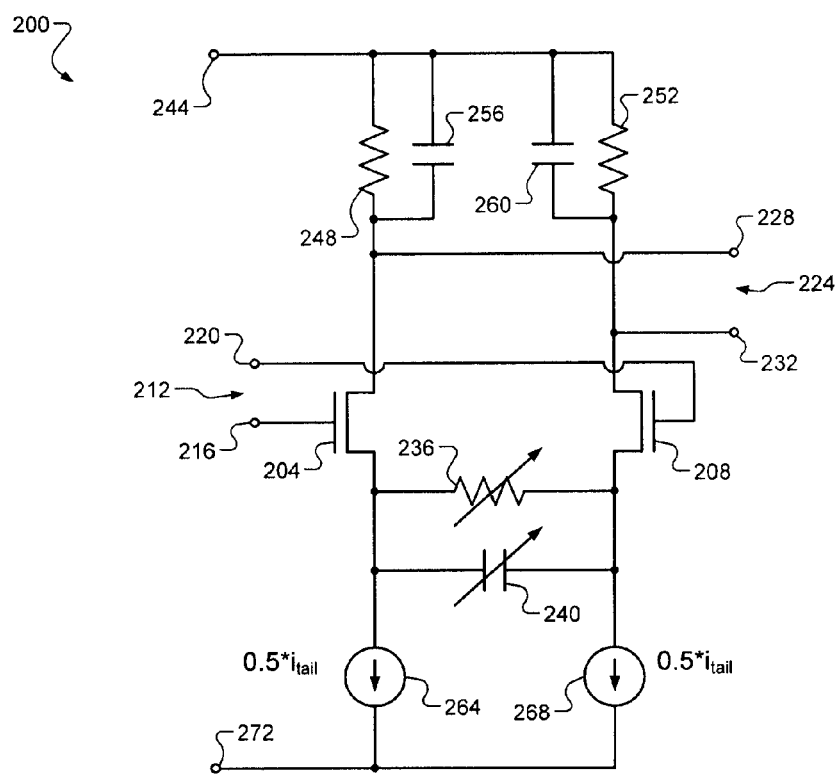
FIG. 2 is an example equalizer according to the prior art.
Figure 3:
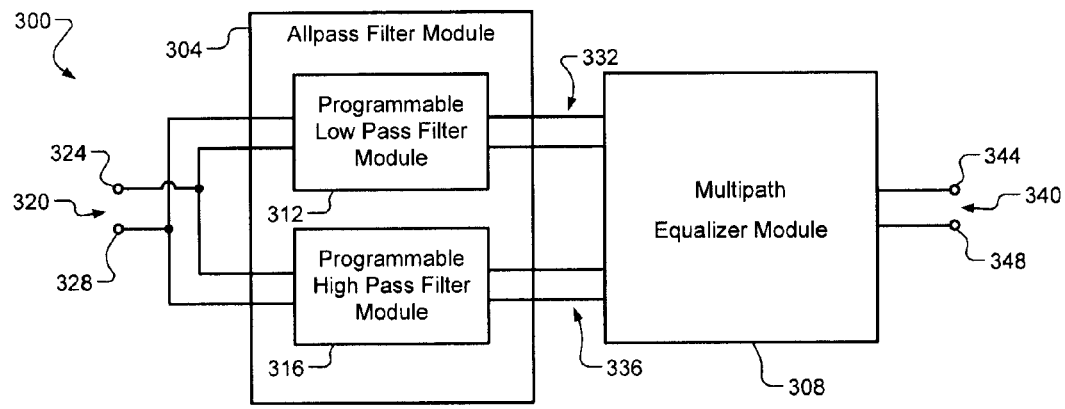
FIG. 3 is an example equalizer including a programmable allpass filter according to the principles of present disclosure.

FIG. 3 shows an equalizer 300 including a programmable allpass filter module 304 and a multipath equalizer module 308. For example, the equalizer module 308 implements a multipath Continuous Time Linear Equalizer (CTLE). The allpass filter module 304 includes a programmable low pass filter module 312 and a programmable high pass filter module 316.

The equalizer 300 receives a differential input signal 320 including a pair of differential signal inputs 324 and 328. Both of the differential signal inputs 324 and 328 of the differential input signal 320 are provided to each of the low pass filter module 312 and the high pass filter module 316. The low pass filter module 312 filters out high-frequency components of the differential input signal 320 to generate a low pass differential input signal 332. For example, the low pass filter module 312 filters out high-frequency components above a cutoff frequency. Conversely, the high pass filter module 316 filters out low-frequency components of the differential input signal 320 to generate a high pass differential input signal 336. For example, the high pass filter module 316 filters out low-frequency components below the cutoff frequency.

In other words, the cutoff frequencies of the low pass filter module 312 and the high pass filter module 316 are the same or substantially the same. Accordingly, the low pass differential input signal 332 and the high pass differential input signal 336 represent the entire differential input signal 320. By filtering the differential input signal 320 in the manner described, a phase of the differential input signal 320 is changed to compensate for any phase distortion in the received signal. Further, correcting for the phase distortion can be accomplished without affecting an amplitude of the differential input signal 320. For example, the equalizer module 308 receives the low pass differential input signal 332 and the high pass differential input signal 336 to generate a differential output signal 340 having differential signal outputs 344 and 348. Operating parameters of the low pass filter module 312 and the high pass filter module 316 may be configurable to adjust a frequency dependent phase shift of the differential output signal with respect to the differential input signal, and/or to adjust a shape of the frequency dependent phase shift.

Figure 4:
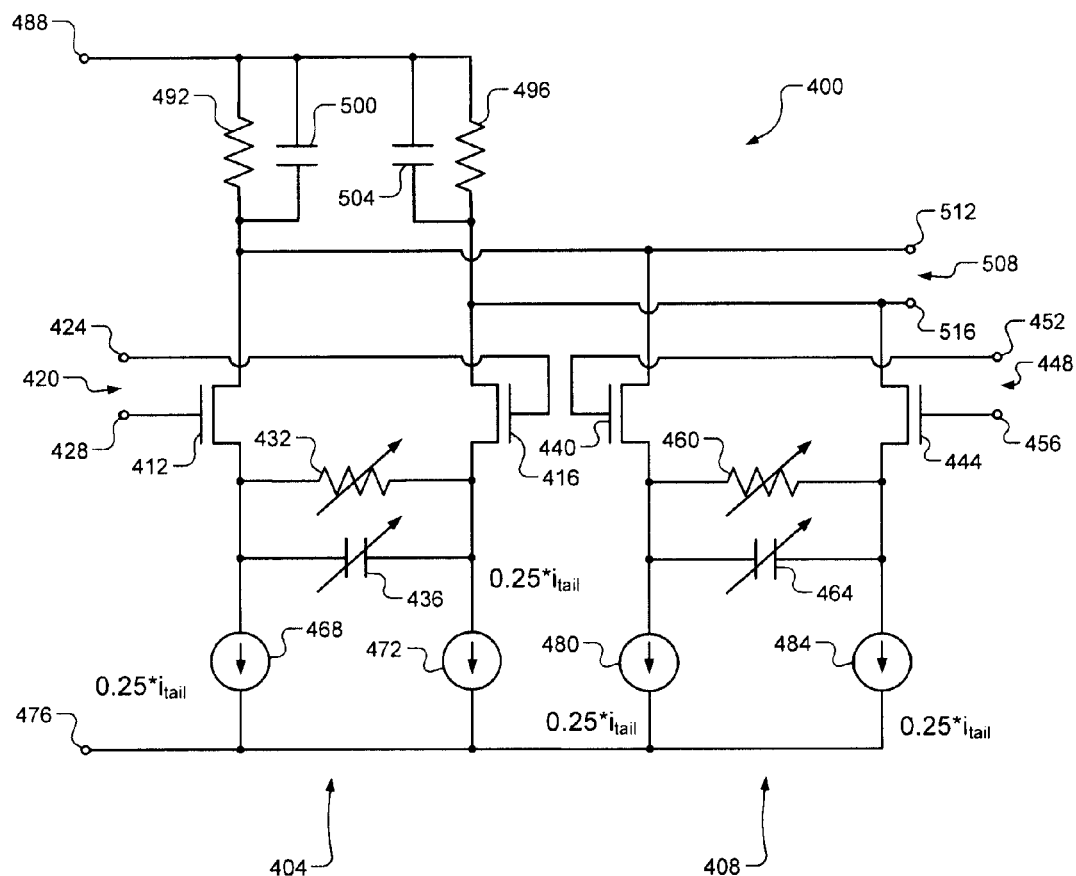
FIG. 4 is an example multipath equalizer according to the principles of the present disclosure.

FIG. 4 shows an example multipath equalizer 400 (e.g., a CTLE) including a first path 404 and a second path 408. The first path 404 includes a first active device 412 and a second active device 416. The first active device 412 and the second active device 416 may include, for example, transistors (e.g., NMOS transistors). The first active device 412 and the second active device 416 receive a low pass differential input signal 420 including a pair of differential inputs 424 and 428, respectively. For example, the low pass differential input signal 420 corresponds to the low pass differential input signal 332 as shown in FIG. 3. The pair of differential inputs 424 and 428 may correspond to a positive differential input and a negative differential input, respectively.

The first path 404 includes a resistor 432 and a capacitor 436 connected in parallel between the first active device 412 and the second active device 416. The resistor 432 may be a variable resistor including an electronically-controlled circuit having a variable resistance. The capacitor 436 may be a variable capacitor including an electronically-controlled circuit having a variable capacitance.

The second path 408 includes a third active device 440 and a fourth active device 444. The third active device 440 and the fourth active device 444 may include, for example, transistors (e.g., NMOS transistors). The third active device 440 and the fourth active device 444 receive a high pass differential input signal 448 including a pair of differential inputs 452 and 456, respectively. For example, the high pass differential input signal 448 corresponds to the high pass differential input signal 336 as shown in FIG. 3. The pair of differential inputs 452 and 456 may correspond to a negative differential input and a positive differential input, respectively.

The second path 408 includes a resistor 460 and a capacitor 464 connected in parallel between the third active device 440 and the fourth active device 444. The resistor 460 may be a variable resistor including an electronically-controlled circuit having a variable resistance. The capacitor 464 may be a variable capacitor including an electronically-controlled circuit having a variable capacitance.

In the first path 404, a first tail current $I_{tail1}$ controlled by a first current source 468 and a second tail current $I_{tail2}$ controlled by a second current source 472 are connected to ground 476. In the second path 408, a third tail current $I_{tail3}$ controlled by a third current source 480 and a fourth tail current $I_{tail2}$ controlled by a fourth current source 484 are connected to ground 476. The first current source 468, the second current source 472, the third current source 480, and the fourth current source 484 may be configured such that each of the first tail current $I_{tail1}$, the second tail current $I_{tail2}$, the third tail current $I_{tail3}$, and the fourth tail current $I_{tail4}$ has approximately the same magnitude and direction. Accordingly, each of the currents $I_{tail1}$, $I_{tail2}$, $I_{tail3}$, and $I_{tail4}$ correspond to one quarter of an overall current $I_{tail}$ (i.e., $0.25*I_{tail}$) flowing from a power supply voltage 488 to ground 476.

The power supply voltage 488 is provided to the equalizer 400 and is connected to the first active device 412, the second active device 416, the third active device 440, and the fourth active device 444 via a first load resistor 492, a second load resistor 496, a first load capacitor 500, and a second load capacitor 504. The capacitance values of each of the load capacitors 500 and 504 may represent parasitic capacitances in circuitry of a corresponding portion of the equalizer 400 and/or a capacitance of circuitry that is external to the equalizer 400. Similarly, values of each of the load resistors 492 and 496 may represent a resistance corresponding to leakage currents in circuitry of a corresponding portion of the equalizer 400 and/or a resistance of circuitry that is external to the equalizer 400. The resistance values of the load resistors 492 and 496 may be programmable values.

Outputs (e.g., drains) of the first active device 412 and the third active device 440 are connected together. Similarly, outputs (e.g., drains) of the second active device 416 and the fourth active device 444 are connected together. Accordingly, outputs of the first active device 412 and the third active device 440 corresponding to the differential input 428 and the differential input 452 (e.g., the negative differential inputs), respectively, are summed. Similarly, outputs of the second active device 416 and the fourth active device 444 corresponding to the differential input 424 and the differential input 456 (e.g., the positive differential inputs), respectively, are summed. In this manner, the low pass differential signal negative component (e.g., the differential input 428) and the high pass differential signal negative component (e.g., the differential input 452) are combined. Conversely, the low pass differential signal positive component (e.g., the differential input 424) and the high pass differential signal negative component (e.g., the differential input 456) are combined.

The equalizer 400 outputs a differential output signal 508 having a pair of differential outputs 512 and 516. The differential output 512 (e.g., a negative differential output) corresponds to the sum of the outputs of the first active device 412 and the third active device 440. Conversely, the differential output 516 (e.g., a positive differential output) corresponds to the sum of the outputs of the second active device 416 and the fourth active device 444. Accordingly, the differential output signal 508 corresponds to the summed low pass differential input signal 420 and high pass differential input signal 448.

Figure 5:
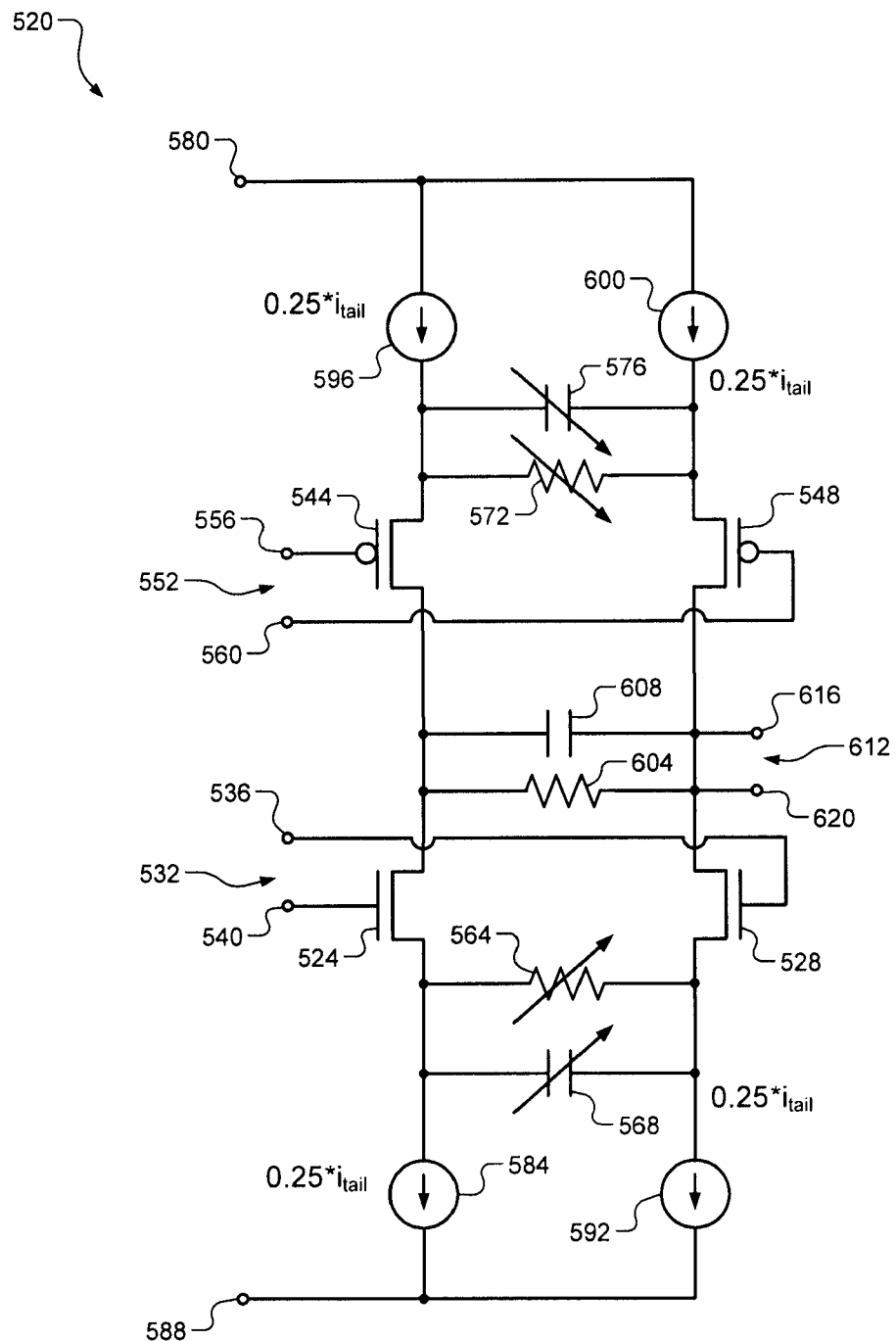
FIG. 5 is another example multipath equalizer according to the principles of the present disclosure.

FIG. 5 shows another example implementation of a multipath equalizer 520. For example, the equalizer 520 is implemented as a complementary dual path CTLE. The equalizer 520 reduces current consumption (e.g., as compared to the equalizer 400) by a factor of two. The equalizer 520 includes a first active device 524 and a second active device 528. The first active device 524 and the second active device 528 may include, for example, transistors (e.g., NMOS transistors). The first active device 524 and the second active device 528 receive a low pass differential input signal 532 including a pair of differential inputs 536 and 540, respectively. The equalizer 520 includes a third active device 544 and a fourth active device 548. The third active device 544 and the fourth active device 548 may include, for example, transistors that are complementary to the transistors of the first active device 524 and the second active device 528 (e.g., PMOS transistors). The third active device 544 and the fourth active device 548 receive a high pass differential input signal 552 including a pair of differential inputs 556 and 560, respectively.

The equalizer 520 includes a first resistor 564 and a first capacitor 568 connected in parallel between the first active device 524 and the second active device 528. The equalizer 520 also includes a second resistor 572 and a second capacitor 576 connected in parallel between the third active device 544 and the fourth active device 548. The resistors 564 and 572 may be variable resistors including an electronically-controlled circuit having a variable resistance. The capacitors 568 and 576 may be variable capacitors including an electronically-controlled circuit having a variable capacitance. Frequency dependent degeneration of the equalizer 520 may be programmed by adjusting the values of the resistors 564 and 572 and the capacitors 568 and 576.

A power supply voltage 580 is provided to the equalizer 520 to provide current to the active devices 524, 528, 544, and 548. A first current source 584 connected between the first active device 524 and ground 588 controls a first tail current $I_{tail1}$. A second current source 592 connected between the second active device 528 and ground 584 controls a second tail current $I_{tail2}$. A third current source 596 connected between the power supply voltage 580 and the third active device 544 controls a third tail current $I_{tail3}$. A fourth current source 600 connected between the power supply voltage 580 and the fourth active device 548 controls a fourth tail current $I_{tail4}$. The current sources 584, 592, 596, and 600 may be configured such that each of the tail currents has approximately the same magnitude and direction. Accordingly, each of the tail currents corresponds to one quarter of an overall current $I_{tail}$ (i.e., $0.5*I_{tail}$) flowing from the power supply voltage 580 to ground 588.

The equalizer 520 includes an output resistor 604 and an output capacitor 608. A differential output signal 612 is provided by the equalizer 520 via the output resistor 604 and the output capacitor 608. The differential output signal 612 includes a pair of differential outputs 616 and 620.

Outputs (e.g., drains) of the first active device 524 and the third active device 544 are connected together. Similarly, outputs (e.g., drains) of the second active device 528 and the fourth active device 548 are connected together. Accordingly, outputs of the first active device 524 and the third active device 544 corresponding to the differential input 540 and the differential input by 56 (e.g., negative differential inputs), respectively, are summed. Similarly, outputs of the second active device 528 and the fourth active device 548 corresponding to the differential input 536 and the differential input 560 (e.g., positive differential inputs), respectively, are summed.

In this manner, the low pass differential signal negative component (e.g., the differential input 540) and the high pass differential signal negative component (e.g., the differential input 556) are combined. Conversely, the low pass differential signal positive component (e.g., the differential input 536) and the high pass differential signal negative component (e.g., the differential input 560) are combined. Accordingly, the differential output signal 612 corresponds to the summed low pass differential input signal 532 and high pass differential input signal 552. Although not shown in FIG. 5, the equalizer 520 may include a common mode feedback circuit to provide a common mode feedback voltage. For example only, a voltage across the output resistor 604 may be split, and a common mode feedback circuit senses the resulting voltage as a common mode voltage. The common mode feedback circuit provides a common mode correction signal based on the common mode voltage (e.g., to compensate for a common mode current component, correct DC outputs, etc).

Figure 6:
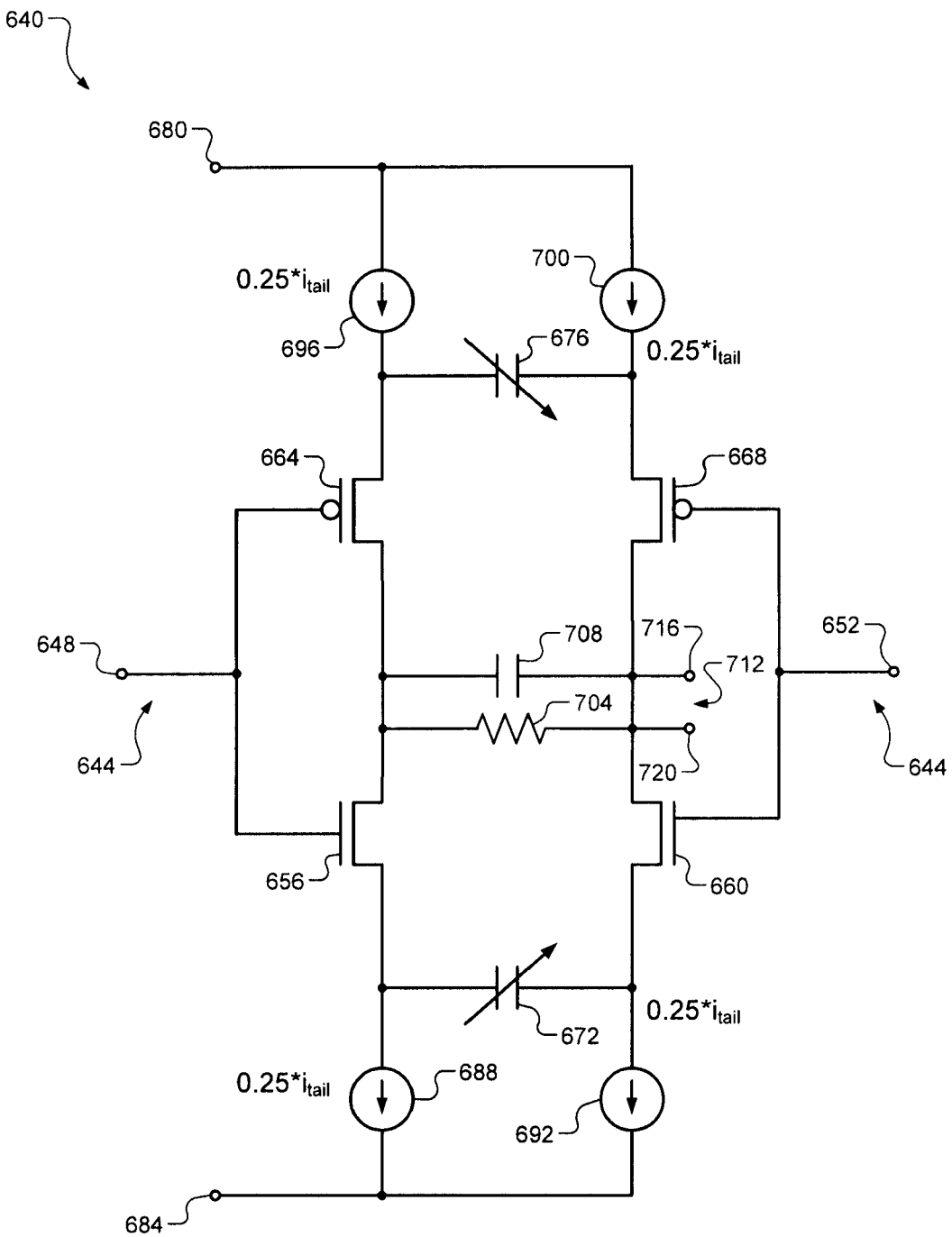
FIG. 6 is an example equalizer implementing a built-in allpass filter transfer function according to the principles of the present disclosure.

FIG. 6 shows another example implementation of an equalizer 640. In the equalizer 640, the values of resistances corresponding to the resistors 564 and 572 of FIG. 5 are set to zero (e.g., a very low or substantially zero value). As such, depictions of corresponding resistors in the equalizer 640 of FIG. 6 are omitted. In this manner, the equalizer 640 implements a built in allpass filter transfer function. Accordingly, the allpass filter module 304 including the low pass filter module 312 and the high pass filter module 316 as shown in FIG. 3 are not required and can be omitted from the circuit. Instead, only a single differential input signal 644, including a pair of differential inputs 648 and 652, is provided to the equalizer 640.

Similar to the equalizer 520 shown in FIG. 5, the equalizer 640 includes a first active device 656, a second active device 660, a third active device 664, and a fourth active device 668. A first capacitor 672 is connected between the first active device 656 and the second active device 660. A second capacitor 676 is connected between the third active device 664 and the fourth active device 668.

A power supply voltage 680 is provided to the equalizer 640, and current flows through the equalizer 640 from the power supply voltage 680 to ground 684. The equalizer 640 includes a first current source 688, a second current source 692, a third current source 696, and a fourth current source 700 to control a first tail current $I_{tail1}$, a second tail current $I_{tail2}$, a third tail current $I_{tail3}$, and a fourth tail current $I_{tail4}$, respectively. Each of the tail currents may correspond to one quarter of an overall current $I_{tail}$ (i.e., $0.5*I_{tail}$) flowing from the power supply voltage 680 to ground 684.

The equalizer 640 includes an output resistor 704 and an output capacitor 708. A differential output signal 712 is provided by the equalizer 640 via the output resistor 704 and the output capacitor 708. The differential output signal 712 includes a pair of differential outputs 716 and 720.

Figure 7:
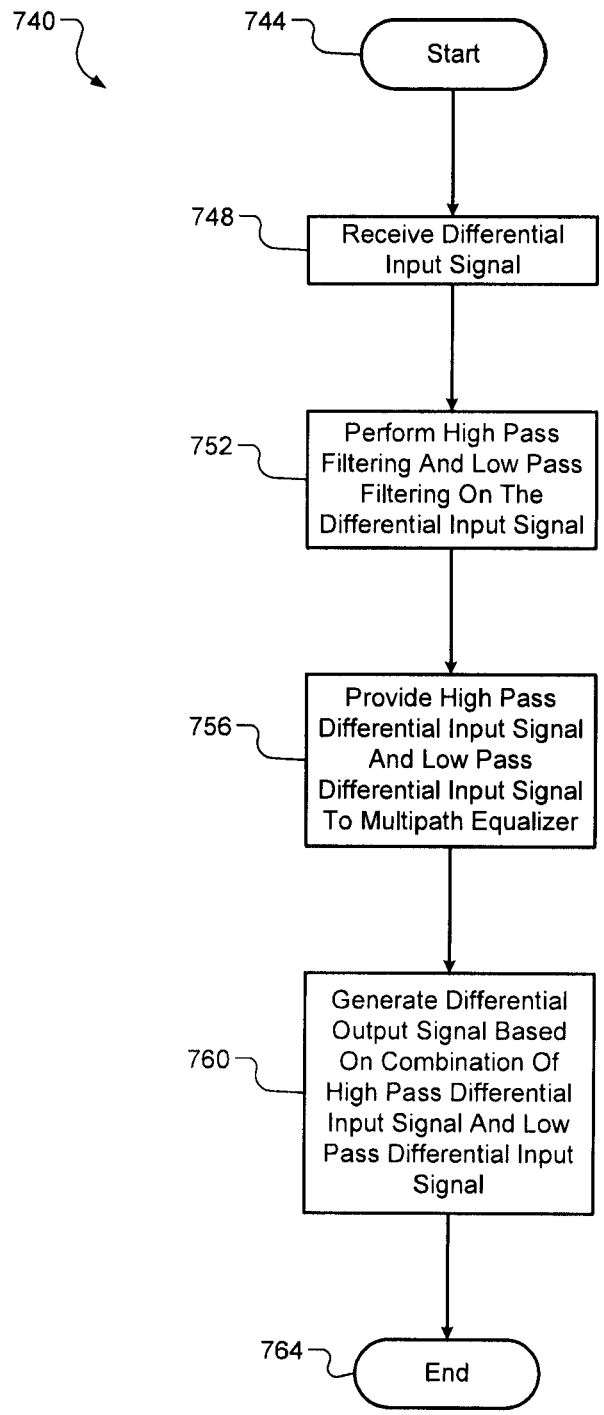
FIG. 7 is an example allpass filtering equalizer method according to the principles of the present disclosure.

FIG. 7 shows an example allpass filtering equalizer method 740. The method 740 starts at 744. At 748, the method 740 receives a differential input signal. At 752, the method 740 independently performs high pass filtering and low pass filtering on the differential input signal to generate a high pass differential input signal and a low pass differential input signal. At 756, the method 740 provides the high pass differential input signal in the low pass differential input signal to a multipath equalizer. At 760, the method 740 generates a differential output signal based on a combination of the high pass differential input signal and a low pass differential input signal. The method 740 ends at 764.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An equalizer, comprising:
    a first module configured to i) receive a differential input signal, ii) perform low pass filtering on the differential input signal to generate a low pass differential input signal by filtering out first frequency components of the differential input signal that are above a first cutoff frequency, and iii) perform high pass filtering on the differential input signal to generate a high pass differential input signal by filtering out second frequency components of the differential input signal that are below a second cutoff frequency, wherein the first cutoff frequency is the same as the second cutoff frequency, and wherein the low pass filtering and the high pass filtering do not affect an amplitude of the differential input signal; and
    a second module configured to i) receive the low pass differential input signal and the high pass differential input signal, and ii) generate a differential output signal based on a combination of the low pass differential input signal and the high pass differential input signal.

2. The equalizer of claim 1, wherein the first module comprises:
    a low pass filter module configured to perform the low pass filtering on the differential input signal to generate the low pass differential input signal; and
    a high pass filter module configured to perform the high pass filtering on the differential input signal to generate the high pass differential input signal,
    wherein the low pass filter module and the high pass filter module are configurable to i) adjust a frequency dependent phase shift of the differential output signal with respect to the differential input signal, and ii) adjust a shape of the frequency dependent phase shift.

3. The equalizer of claim 1, wherein the second module comprises:
    a first path including a first active element and a second active element configured to receive a first differential input of the low pass differential input signal and a second differential input of the low pass differential signal, respectively; and
    a second path including a third active element and a fourth active element configured to receive a first differential input of the high pass differential input signal and a second differential input of the high pass differential signal, respectively.

4. The equalizer of claim 3, wherein the first active element, the second active element, the third active element, and the fourth active element include transistors.

5. The equalizer of claim 3, when the second module further comprises a first current source, a second current source, a third current source, and a fourth current source connected in series with the first active element, the second active element, the third active element, and the fourth active element, respectively.

6. An equalizer, comprising:
    a first module configured to i) receive a differential input signal, ii) perform low pass filtering on the differential input signal to generate a low pass differential input signal, and iii) perform high pass filtering on the differential input signal to generate a high pass differential input signal; and
    a second module configured to i) receive the low pass differential input signal and the high pass differential input signal, and ii) generate a differential output signal based on a combination of the low pass differential input signal and the high pass differential input signal, wherein
    the differential output signal includes a first differential output corresponding to a sum of i) a first differential input of the low pass differential input signal and ii) a first differential input of the high pass differential input signal, and
    the differential output signal includes a second differential output corresponding to a sum of i) a second differential input of the low pass differential signal and ii) a second differential input of the high pass differential input signal.

7. The equalizer of claim 6, wherein:
    the first differential input of the low pass differential input signal and the first differential input of the high pass differential input signal correspond to negative differential inputs; and
    the second differential input of the low pass differential input signal and the second differential input of the high pass differential input signal correspond to a positive differential inputs.

8. A multipath equalizer, comprising:
    a first active element configured to receive a first differential input of a low pass differential input signal;
    a second active element configured to receive a second differential input of the low pass differential input signal;
    a third active element configured to receive a first differential input of a high pass differential input signal; and
    a fourth active element configured to receive a second differential input of the high pass differential input signal, wherein the multipath equalizer is configured to generate a differential output signal comprising i) a first differential output corresponding to a combination of the first differential input of the low pass differential input signal and the first differential input of the high pass differential input signal, and ii) a second differential output corresponding to a combination of the second differential input of the low pass differential input signal and the second differential input of the high pass differential input signal.

9. The multipath equalizer of claim 8, wherein:
the first active element and the second active element comprise a first type of transistor; and
the third active element and the fourth active element comprise a second type of transistor.

10. The multipath equalizer of claim 8, wherein the first active element and the third active element are connected in series, and the second active element and the fourth active element are connected in series.

11. The multipath equalizer of claim 10, further comprising:
a first current source connected in series with the first active element and the third active element;
a second current source connected in series with the second active element and the fourth active element;
a third current source connected in series with the first active element and the third active element; and
a fourth current source connected in series with the second active element and the fourth active element.

12. The multipath equalizer of claim 8, further comprising:
a first variable resistor and a first variable capacitor connected in parallel between the first active element and the second active element; and
a second variable resistor and a second variable capacitor connected in parallel between the third active element and the fourth active element.

13. The multipath equalizer of claim 8, further comprising:
an output capacitor and an output resistor connected in parallel between i) the first active element in the third active element and ii) the second active element and the fourth active element.

14. A multipath equalizer, comprising:
a first active element configured to receive a first differential input of a differential input signal;
a second active element configured to receive a second differential input of the differential input signal;
a third active element configured to receive the first differential input of the differential input signal; and
a fourth active element configured to receive the second differential input of the differential input signal,
wherein the multipath equalizer is configured to generate a differential output signal comprising i) a first differential output corresponding to a combination of outputs of the first active element and the third active element, and ii) a second differential output corresponding to a combination of outputs of the second active element in the fourth active element.

15. The multipath equalizer of claim 14, wherein:
the first active element and the second active element comprise a first type of transistor; and
the third active element and the fourth active element comprise a second type of transistor.

16. The multipath equalizer of claim 14, wherein the first active element and the third active element are connected in series, and the second active element and the fourth active element are connected in series.

17. The multipath equalizer of claim 16, further comprising:
a first current source connected in series with the first active element and the third active element;
a second current source connected in series with the second active element and the fourth active element;
a third current source connected in series with the first active element and the third active element; and
a fourth current source connected in series with the second active element and the fourth active element.

18. The multipath equalizer of claim 14, further comprising:
a first variable capacitor connected between the first active element and the second active element; and
a second variable capacitor connected between the third active element and the fourth active element.

19. The multipath equalizer of claim 14, further comprising:
an output capacitor and an output resistor connected in parallel between i) the first active element in the third active element and ii) the second active element and the fourth active element.

20. A method of operating an equalizer, the method comprising:
receiving a differential input signal;
performing low pass filtering on the differential input signal to generate a low pass differential input signal by filtering out first frequency components of the differential input signal that are above a first cutoff frequency;
performing high pass filtering on the differential input signal to generate a high pass differential input signal by filtering out second frequency components of the differential input signal that are below a second cutoff frequency, wherein the first cutoff frequency is the same as the second cutoff frequency, and wherein the low pass filtering and the high pass filtering do not affect an amplitude of the differential input signal; and
using a multipath equalizer module,
receiving the low pass differential input signal and the high pass differential input signal, and
generating a differential output signal based on a combination of the low pass differential input signal and the high pass differential input signal.

21. The method of claim 20, further comprising
receiving a first differential input of the low pass differential input signal at a first active element;
receiving a second differential input of the low pass differential signal at a second active element;
receiving a first differential input of the high pass differential input signal at a third active element; and
receiving a second differential input of the high pass differential signal at a fourth active element.

22. The method of claim 21, wherein the first active element, the second active element, the third active element, and the fourth active element include transistors.

23. The method of claim 21, further comprising:
controlling a first current through the first active element using a first current source connected in series with the first active element;
controlling a second current through the second active element using a second current source connected in series with the second active element;
controlling a third current through the third active element using a third current source connected in series with the third active element; and controlling a fourth current through the fourth active element using a fourth current source connected in series with the fourth active element.

24. A method of operating an equalizer, the method comprising:
   receiving a differential input signal;
   performing low pass filtering on the differential input signal to generate a low pass differential input signal;
   performing high pass filtering on the differential input signal to generate a high pass differential input signal; and
   using a multipath equalizer module,
      receiving the low pass differential input signal and the high pass differential input signal, and
      generating a differential output signal based on a combination of the low pass differential input signal and the high pass differential input signal, wherein
   the differential output signal includes a first differential output corresponding to a sum of i) a first differential input of the low pass differential input signal and ii) a first differential input of the high pass differential input signal, and
   the differential output signal includes a second differential output corresponding to a sum of i) a second differential input of the low pass differential signal and ii) a second differential input of the high pass differential input signal.

25. The method of claim 24, wherein:
   the first differential input of the low pass differential input signal and the first differential input of the high pass differential input signal correspond to negative differential inputs; and
   the second differential input of the low pass differential input signal and the second differential input of the high pass differential input signal correspond to positive differential inputs.

* * * * *